(12) United States Patent (10) Patent No.: US 9,266,093 B2
Matsumura et al. (45) Date of Patent: Feb. 23, 2016

(54) EXHAUST GAS PURIFICATION CATALYST AND METHOD FOR PRODUCING THE SAME

(71) Applicant: MAZDA MOTOR CORPORATION, Hiroshima (JP)

(72) Inventors: Yasuhiro Matsumura, Hiroshima (JP); Akihide Takami, Hiroshima (JP); Masahiko Shigetsu, Higashi-Hiroshima (JP); Hisaya Kawabata, Hiroshima (JP); Masaaki Akamine, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/183,343

(22) Filed: Feb. 18, 2014

(65) Prior Publication Data

US 2014/0235433 A1 Aug. 21, 2014

(30) Foreign Application Priority Data

Feb. 21, 2013 (JP) .................................. 2013-031865

(51) Int. Cl.
| | |
|---|---|
| *B01J 23/00* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/63* | (2006.01) |
| *B01J 37/02* | (2006.01) |
| *B01J 37/03* | (2006.01) |
| *B01J 37/16* | (2006.01) |
| *B01J 35/00* | (2006.01) |

(Continued)

(52) U.S. Cl.
CPC ........ *B01J 23/63* (2013.01); *B01J 23/10* (2013.01); *B01J 23/464* (2013.01); *B01J 35/0006* (2013.01); *B01J 37/0201* (2013.01); *B01J 37/0244* (2013.01); *B01J 37/031* (2013.01); *B01J 37/16* (2013.01); *B01D 53/9445* (2013.01); *B01D 2255/1023* (2013.01); *B01D 2255/1025* (2013.01); *B01D 2255/206* (2013.01); *B01D 2255/2065* (2013.01); *B01D 2255/20715* (2013.01); *B01D 2255/908* (2013.01); *B01D 2255/9022* (2013.01); *B01J 2523/00* (2013.01); *Y02T 10/22* (2013.01)

(58) Field of Classification Search
CPC .......... B01J 23/10; B01J 23/44; B01J 23/464; B01J 23/63; B01J 21/066
USPC .................................. 502/304, 349, 326, 339
See application file for complete search history.

(56) References Cited

U.S. PATENT DOCUMENTS

| 4,492,769 A | 1/1985 | Blanchard et al. |
| 6,150,288 A | 11/2000 | Suzuki et al. |

(Continued)

FOREIGN PATENT DOCUMENTS

| CN | 101479023 A | 7/2009 |
| JP | S59-76548 A | 5/1984 |

(Continued)

*Primary Examiner* — Cam N. Nguyen
(74) *Attorney, Agent, or Firm* — Studebaker & Brackett PC

(57) ABSTRACT

An exhaust gas purification catalyst includes a Rh-containing catalyst layer provided on a base material. The Rh-containing catalyst layer includes Rh-supporting Zr-based composite oxide in which Rh6 is supported on Zr-based composite oxide containing Zr and a rare earth metal except Ce. The Rh-supporting Zr-based composite oxide has been previously subjected to a reduction treatment.

5 Claims, 3 Drawing Sheets

(51) Int. Cl.
*B01J 23/46* (2006.01)
*B01D 53/94* (2006.01)

(56) References Cited

U.S. PATENT DOCUMENTS

| | | | |
|---|---|---|---|
| 6,306,794 B1 | 10/2001 | Suzuki et al. | |
| 8,530,372 B2 * | 9/2013 | Luo et al. | 502/303 |
| 8,545,780 B1 * | 10/2013 | Chen et al. | 423/213.2 |
| 8,568,675 B2 * | 10/2013 | Deeba et al. | 423/213.5 |
| 8,580,705 B2 * | 11/2013 | Aoki et al. | 502/304 |
| 8,580,706 B2 * | 11/2013 | Matsueda et al. | 502/328 |
| 8,617,496 B2 * | 12/2013 | Wei et al. | 423/213.2 |
| 8,640,440 B2 * | 2/2014 | Klingmann et al. | 60/274 |
| 8,663,588 B2 * | 3/2014 | Lindner et al. | 423/213.5 |
| 8,833,064 B2 * | 9/2014 | Galligan et al. | 60/299 |
| 8,975,204 B2 * | 3/2015 | Hori et al. | 502/304 |
| 2003/0050189 A1 | 3/2003 | Morikawa et al. | |
| 2009/0170689 A1 | 7/2009 | Hatanaka et al. | |
| 2010/0263357 A1 | 10/2010 | Lindner et al. | |
| 2011/0237429 A1 | 9/2011 | Akamine et al. | |
| 2012/0186238 A1 | 7/2012 | Akamine et al. | |
| 2012/0328499 A1 | 12/2012 | Ando et al. | |

FOREIGN PATENT DOCUMENTS

| | | |
|---|---|---|
| JP | H10-182155 A | 7/1998 |
| JP | H11-123330 A | 5/1999 |
| JP | 2003-265958 A | 9/2003 |
| JP | 2004-174490 A | 6/2004 |
| JP | 2004-275919 A | 10/2004 |
| JP | 2007-289920 A | 11/2007 |
| JP | 2011-200817 A | 10/2011 |
| JP | 2012-154259 A | 8/2012 |

* cited by examiner

EXHAUST GAS PURIFICATION CATALYST AND METHOD FOR PRODUCING THE SAME

CROSS-REFERENCE TO RELATED APPLICATION

This application claims priority to Japanese Patent Application No. 2013-031865 filed on Feb. 21, 2013, the entire disclosure of which is incorporated by reference herein.

BACKGROUND

The present disclosure relates to exhaust gas purification catalysts and methods for producing the catalysts.

Exhaust gas purification catalysts (three-way catalysts) loading catalytic metals, such as Pt, Pd, or Rh, on oxide supports have been used in order to purify hazardous substances, such as hydrocarbon (HC), carbon monoxide (CO), and nitrogen oxide ($NO_x$), emitted from automobile engines.

The exhaust gas purification catalysts include, for example, a catalyst loading Pt on $CeO_2$. This catalyst is known to have a large oxygen storage/release capacity and show excellent performance in oxidizing and purifying CO and HC. The catalyst can efficiently generate $H_2$ through a water gas shift reaction and, thus, promote reduction purification of $NO_x$ by using $H_2$ generated.

An exhaust gas purification catalyst becomes active at a predetermined temperature, and can purify the hazardous substances described above in exhaust gas into a nontoxic gas through oxidization or reduction. However, in an initial period of starting up an engine in which the engine is not warmed up enough yet, the temperature of the exhaust gas is low, and thus, the catalyst does not become active. Accordingly, in this initial period, hazardous substances in the exhaust gas are emitted to the air without being purified. To prevent such emission, catalysts that become active at low temperatures, i.e., exhibit excellent exhaust gas purification performance, have been in demand.

Japanese Unexamined Patent Publication No. 2003-265958 describes a catalytic material which is loaded with a precious metal as a catalytic metal on a composite oxide containing $CeO_2$ and $ZrO_2$ as main components and on which a heat treatment has been performed at 600° C. to 1000° C. in a reduction atmosphere. In the catalytic material of Japanese Unexamined Patent Publication No. 2003-265958, a precious metal performs storage/release of lattice oxygen of $CeO_2$, oxygen can be released in a reduction atmosphere even at low temperatures, and thus, the catalytic material can exhibit excellent purification performance of exhaust gas.

SUMMARY

Exhaust gas purification catalysts as those described above degrade their purification performance to hazardous substances when being exposed to high-temperature exhaust gas in some cases. This is because the surface area of a catalytic metal in contact with exhaust gas decreases due to agglomeration of particles of the catalytic metal supported on a support and/or dissolution of the catalytic metal in the support and, thereby, the number of active sites of the catalyst decreases. Consequently, hazardous substances in the exhaust gas are insufficiently purified, and are released to the air.

Among the catalytic metals described above, Rh is known to have a $NO_x$ reduction function and a partial oxidation function of HC and CO. However, when Rh is oxidized, the $NO_x$ reduction function deteriorates, whereas when Rh is completely reduced, the partial oxidation function of HC and CO deteriorates. In this manner, the catalyst performance varies depending on properties of Rh. The catalyst performance also affects properties of a Rh-supporting support. To obtain highly efficient exhaust gas purification performance with a catalyst activity at low temperatures, Rh having properties excellent enough to show optimum catalyst performance needs to be supported on a support suitable for improving catalyst performance by increasing the number of active sites of the catalyst.

It is therefore an object of the present disclosure to provide a catalyst that becomes active even at low temperatures and has catalyst performance excellent enough to purify hazardous substances in exhaust gas efficiently.

Intensive investigation and study by inventors of the present disclosure show that an exhaust gas purification catalyst containing a composite oxide obtained by reducing Rh-supporting Zr-based composite oxide in which Rh is supported on Zr-based composite oxide including Zr and a rare earth metal except Ce becomes active even at low temperatures and efficiently purifies hazardous substances in exhaust gas.

Specifically, an exhaust gas purification catalyst according to the present disclosure is an exhaust gas purification catalyst in which a Rh-containing catalyst layer is located on a base material. The Rh-containing catalyst layer includes Rh-supporting Zr-based composite oxide in which Rh is supported on Zr-based composite oxide containing Zr and a rare earth metal except Ce. The Rh-supporting Zr-based composite oxide has been previously subjected to a reduction treatment.

In the exhaust gas purification catalyst, the Rh-containing catalyst layer includes Zr-based composite oxide. Since this Zr-based composite oxide shows oxygen ion conduction, reactive oxygen species can be released by the oxygen ion conduction, thereby promoting oxidation purification of HC and CO. The Rh-supporting Zr-based composite oxide promotes a steam reforming reaction. This reaction generates $H_2$, thereby also promoting reduction purification of $NO_x$.

In the exhaust gas purification catalyst, the Rh-supporting Zr-based composite oxide has been subjected to the reduction treatment, thereby increasing the ratio of a metal Rh deposited on the surface of the Zr-based composite oxide. In the catalyst, Rh is supported on the Zr-based composite oxide serving as a support, and most of this Rh is in the state of $Rh_2O_3$ and is bonded to, or dissolved in, the support, due to, for example, a heat treatment performed in preparing a catalytic material. In general, Rh particles in a reduced state are deposited as a metal Rh on the surface of the support. In addition, Rh in a metal state is considered to contribute to excellent catalytic reactions. Thus, performing a reduction treatment on the Rh-supporting Zr-based composite oxide causes the metal Rh to be dispersed on the surface of the Zr-based composite oxide, thereby increasing the surface area of Rh in contact with exhaust gas. Accordingly, the number of active sites of the catalyst increases. As a result, the catalyst can exhibit excellent catalyst performance even at low temperatures, and thus, can efficiently purify exhaust gas.

In the exhaust gas purification catalyst, the reduction treatment is preferably performed at a temperature of 550° C. to 800° C., both inclusive, in a reduction atmosphere containing CO.

In this case, Rh in the Rh-supporting Zr-based composite oxide can be dispersed as a metal Rh over the surface of the Zr-based composite oxide at a high dispersion. Consequently, the surface area of Rh in contact with exhaust gas increases, and the number of active sites increases accordingly. As a result, exhaust gas can be efficiently purified.

In the exhaust gas purification catalyst, the Rh-containing catalyst layer preferably includes Rh-supporting CeZr-based composite oxide in which Rh is supported on CeZr-based composite oxide containing Zr and Ce and which is not subjected to the reduction treatment.

In this case, since the CeZr-based composite oxide is supposed to have an oxygen storage/release capacity and cause an oxygen exchange reaction so as to release a large amount of reactive oxygen species and Rh contributes to oxygen storage/release and an oxygen exchange reaction, the released reactive oxygen species can promote oxidation purification of CO and HC. As a result, catalyst performance can be enhanced, thereby enhancing purification performance of exhaust gas.

In the exhaust gas purification catalyst, the Rh-containing catalyst layer preferably includes a binder material of Rh-doped CeZr-based composite oxide in which Rh is dissolved in the CeZr-based composite oxide and which is not subjected to the reduction treatment.

Similarly to the Rh-supporting CeZr-based composite oxide used as the catalytic material, the use of such a composite oxide as a binder material can increase the amount of released reactive oxygen species, thereby promoting oxidation purification of CO and HC.

In the exhaust gas purification catalyst, a Pd-containing catalyst layer is preferably provided between the Rh-containing catalyst layer and the base material.

The Pd-containing catalyst layer shows a strong oxidation capacity at low temperatures. Thus, when CO or HC partially oxidized by the Rh-containing catalyst layer flows into this Pd-containing catalyst layer, oxidation purification of CO or HC can be efficiently performed.

A method for producing an exhaust gas purification catalyst according to the present disclosure is directed to a method for producing an exhaust gas purification catalyst in which a Rh-containing catalyst layer is located on a base material. The method includes: providing a Pd-containing catalyst layer on a surface of the base material; preparing Rh-supporting Zr-based composite oxide in which Rh is supported on Zr-based composite oxide containing Zr and a rare earth metal except Ce, Rh-supporting CeZr-based composite oxide in which Rh is supported on CeZr-based composite oxide containing Zr and Ce, and Rh-doped CeZr-based composite oxide obtained by dissolving Rh in CeZr-based composite oxide serving as a binder material; performing a heat treatment on the Rh-supporting Zr-based composite oxide at a temperature of 550° C. to 800° C., both inclusive, in a reduction atmosphere containing CO; mixing the Rh-supporting Zr-based composite oxide subjected to the heat treatment, the Rh-supporting CeZr-based composite oxide, and the Rh-doped CeZr-based composite oxide together to produce a mixture, and making the mixture into slurry, thereby preparing a Rh-containing catalytic material; and providing the Rh-containing catalytic material on a surface of the Pd-containing catalyst layer.

In the method for producing an exhaust gas purification catalyst, the Rh-supporting Zr-based composite oxide is used as a catalytic material, and is subjected to a reduction treatment in a CO-containing reduction atmosphere at a temperature of 550° C. to 800° C., both inclusive. Thus, a metal Rh can be dispersed on the surface of the Zr-based composite oxide at a high dispersion. Accordingly, the surface area of Rh in contact with exhaust gas increases. As a result, an exhaust gas purification catalyst having a large number of active sites of the catalyst and showing excellent exhaust gas purification performance can be obtained. In addition, in this method, the Zr-based composite oxide is used as a support that supports Rh. Since the Zr-based composite oxide shows oxygen ion conduction as described above, reactive oxygen species can be released by the oxygen ion conduction, thereby contributing to oxidation purification of HC and CO. The Rh-supporting Zr-based composite oxide promotes a steam reforming reaction, generates $H_2$, and also contributes to reduction purification of $NO_x$. Thus, a catalyst having excellent purification performance of exhaust gas can be obtained.

An exhaust gas purification catalyst and a method for producing the catalyst according to the present disclosure can allow a large amount of a metal Rh to be dispersed on the surface of a support and shows high purification performance of exhaust gas with a large number of active sites.

DETAILED DESCRIPTION

An embodiment of the present disclosure will be described with reference to the drawings. The following embodiment is merely a preferred example in nature, and is not intended to limit the scope, applications, and use of the invention.

(Catalyst Layer Structure)

Figure 1:
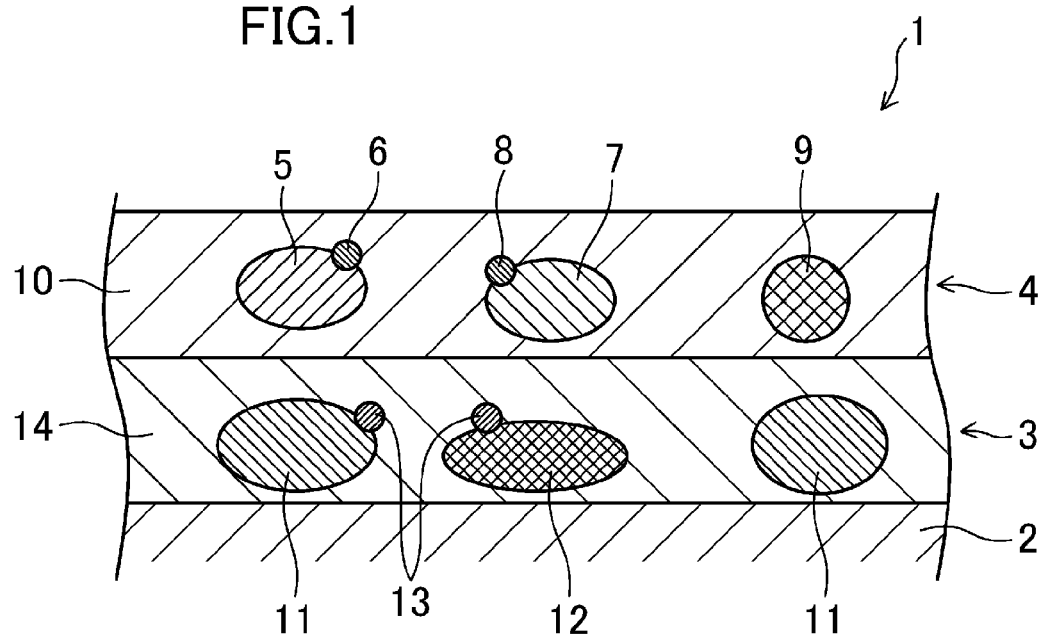
FIG. 1 is a cross-sectional view illustrating a catalyst layer structure of an exhaust gas purification catalyst according to an embodiment of the present disclosure.

A structure of a catalyst layer of an exhaust gas purification catalyst according to an embodiment of the present disclosure will be described with reference to FIG. 1. FIG. 1 is a cross-sectional view illustrating the structure of the catalyst layer of the exhaust gas purification catalyst of this embodiment.

As illustrated in FIG. 1, an exhaust gas purification catalyst 1 of this embodiment is provided on a base material (a honeycomb support) 2 constituting a wall of an exhaust gas passage from an engine of an automobile. Specifically, the exhaust gas purification catalyst 1 includes: a Pd-containing catalyst layer (a lower layer) 3 provided on the base material 2; and a Rh-containing catalyst layer (an upper layer) 4 facing the exhaust gas passage. In other words, the Pd-containing catalyst layer 3 is located between the base material 2 and the Rh-containing catalyst layer 4.

The Rh-containing catalyst layer 4 includes, as a catalytic material, Rh-supporting Zr-based composite oxide in which Rh6 is supported on Zr-based composite oxide 5 containing Zr and a rare earth metal except Ce. In this embodiment, the Rh-supporting Zr-based composite oxide is previously subjected to a reduction treatment, which enhances the catalyst activity of the Rh-supporting Zr-based composite oxide.

Figure 2:
FIG. 2 is a model showing states of Rh on the surface of a composite oxide before and after a reduction treatment.

Specifically, as illustrated in FIG. 2, if the Rh-supporting Zr-based composite oxide were not subjected to a reduction treatment, most part of Rh would generally serve as oxidized Rh ($Rh_2O_3$) 6a and would be bonded to, or dissolved in, the Zr-based composite oxide 5. In this case, the oxidized Rh 6a were bonded while spreading over the surface of the Zr-based composite oxide 5 or being dissolved therein, i.e., the total surface area of Rh exposed from the Zr-based composite oxide 5 would be small. On the other hand, in the Rh-supporting Zr-based composite oxide subjected to a reduction treatment, oxygen is dissociated from oxidized Rh ($Rh_2O_3$) 6a and dissolved Rh so that the oxidized Rh ($Rh_2O_3$) 6a and the dissolved Rh become a metal Rh6, and this metal Rh6 is deposited on the surface of the Zr-based composite oxide 5 and is dispersed over the entire surface of the Zr-based composite oxide 5. As a result, the surface area of the metal Rh6 increases, and the contact surface with exhaust gas increases accordingly. Thus, the number of active sites increases, thereby enabling efficient purification of the exhaust gas.

The Rh-containing catalyst layer 4 preferably includes Rh-supporting CeZr-based composite oxide in which Rh8 is supported on CeZr-based composite oxide 7 containing Zr and Ce, and alumina particles 9. This Rh-supporting CeZr-based composite oxide and the alumina particles 9 are not subjected to the reduction treatment described above. The Rh-supporting CeZr-based composite has a large oxygen storage/release capacity of absorbing oxygen in an excess oxygen atmosphere and releasing oxygen in a reduction atmosphere, and contributes to promotion of oxidation purification of HC and CO. The alumina particles 9 contribute to an increase in thermal resistance of the Rh-containing catalyst layer 4 facing the exhaust gas passage. The alumina particles 9 may contain a rare-earth element, and for example, includes 4 mass % of $La_2O_3$ in this embodiment.

The Rh-containing catalyst layer 4 includes, as a binder, a Rh-doped binder material 10 of Rh-doped CeZr-based composite oxide in which Rh is dissolved in CeZr-based composite oxide containing Zr and Ce.

On the other hand, the Pd-containing catalyst layer 3 includes, as catalytic materials, Pd-supporting CeZr-based composite oxide in which Pd13 is supported on CeZr-based composite oxide 11 and Pd-supporting alumina particles in which Pd13 is supported on alumina particles 12. The Pd-containing catalyst layer 3 also includes CeZr-based composite oxide 11 not loaded with Pd13. The Pd-containing catalyst layer 3 includes a zirconia binder (Y-stabilized zirconia containing 3 mol % of $Y_2O_3$) material 14 as a binder. The Rh-doped binder material 10 and the zirconia binder material 14 are smaller in particle size than other composite oxides serving as catalytic materials in order to function as binders. Specifically, a composite oxide constituting a binder has a particle size of about 200 nm or less in terms of median diameter.

The exhaust gas purification catalyst 1 can be prepared by the following method. First, a base material 2 is immersed in slurry as a mixture of a catalytic material constituting the Pd-containing catalyst layer 3, a binder material, and deionized water, and then is taken out from the slurry. Redundant slurry on the wall surface of the base material 2 facing the exhaust gas passage is removed with an air blow. Then, the slurry on the base material 2 is dried (at 150° C.) in the air and calcined (held at 500° C. for two hours). In this manner, a Pd-containing catalyst layer 3 is formed on the surface of the base material 2.

Thereafter, a Rh-supporting Zr-based composite oxide as a catalytic material constituting the Rh-containing catalyst layer 4 is subjected to a reduction treatment. The reduction treatment can be performed by performing a heat treatment on Rh-supporting Zr-based composite oxide at a temperature of 550° C. to 800° C., both inclusive, in a CO-containing reduction atmosphere.

Subsequently, the base material 2 including the Pd-containing catalyst layer 3 is immersed in slurry as a mixture of a catalytic material constituting the Rh-containing catalyst layer 4, a binder, and deionized water, and then is taken out from the slurry. Then, similarly to the process for the Pd-containing catalyst layer 3, redundant slurry on the Pd-containing catalyst layer 3 is removed with an air blow, and dried (at 150° C.) in the air and calcined (held at 500° C. for two hours). In this manner, a Rh-containing catalyst layer 4 is formed on the surface of the Pd-containing catalyst layer 3 in the base material 2.

(Catalytic Material)

Preparation of the catalytic materials will now be described.

In the following description, a composite oxide in which Rh is supported on $ZrLaYO_x$ is used as an example of the Rh-supporting Zr-based composite oxide included in the Rh-containing catalyst layer 4. In this case, $ZrLaYO_x$ can be prepared by coprecipitation. Specifically, an eight-fold dilution of 28-mass % ammonia water is added to a nitrate solution as a mixture of a zirconium oxynitrate solution, nitric acid lanthanum, nitric acid yttrium, and deionized water, and the resulting solution is neutralized, thereby producing a coprecipitate. A solution containing this coprecipitate is subjected to centrifugation so as to remove supernatant liquid (dewatering). Thereafter, deionized water is added to the dewatered coprecipitate, and the resulting coprecipitate is stirred (washed). This process is repeated the necessary number of times. Then, the coprecipitate is dried in the air at 150° C. for 24 hours, is pulverized, and then is calcined in the air at 500° C. for two hours. In this manner, $ZrLaYO_x$ powder is prepared. The prepared $ZrLaYO_x$ powder is subjected to evaporation to dryness using a nitric acid rhodium aqueous solution, thereby allowing Rh to be supported on $ZrLaYO_x$. In this manner, Rh-supporting Zr-based composite oxide is prepared.

Then, a composite oxide in which Rh is supported on $CeZrNdLaYO_x$ will be described as an example of the Rh-supporting CeZr-based composite oxide included in the Rh-containing catalyst layer 4. In this case, $CeZrNdLaYO_x$ can also be prepared by coprecipitation. Specifically, an eight-fold dilution of 28-mass % ammonia water is added to a nitrate solution as a mixture of cerium nitrate hexahydrate, a zirconium oxynitrate solution, neodymium nitrate hexahydrate, nitric acid lanthanum, nitric acid yttrium, and deionized water, and the resulting solution is neutralized, thereby producing a coprecipitate. Similarly to the process described above, the solution containing this coprecipitate is dewatered and washed, and then dried and calcined. In this manner, $CeZrNdLaYO_x$ powder is prepared. The prepared $CeZrNdLaYO_x$ powder is subjected to evaporation to dryness using a nitric acid rhodium aqueous solution, thereby allowing Rh to be supported on $CeZrNdLaYO_x$. In this manner, Rh-supporting CeZr-based composite oxide is prepared.

Preparation of a binder material included in the Rh-containing catalyst layer 4 will now be described. Here, Rh-doped $CeZrNdYO_x$ is used as Rh-doped CeZr-based composite oxide as a material for a binder material, for example. First, an eight-fold dilution of 28-mass % ammonia water is added to a nitrate solution as a mixture of cerium nitrate hexahydrate, a zirconium oxynitrate solution, neodymium nitrate hexahydrate, nitric acid yttrium, nitric acid rhodium, and deionized water, and the resulting solution is neutralized, thereby producing a coprecipitate. Similarly to the process described above, the solution containing this coprecipitate is dewatered and washed, and then dried and calcined. In this manner, Rh-doped $CeZrNdYO_x$ powder is prepared. Thereafter, deionized water is added to this Rh-doped $CeZrNdYO_x$ powder so as to form slurry (with a solid content of 25 mass %). This slurry is placed in a ball grinder, and is pulverized with 0.5-mm zirconia beads for about three hours. In this manner, a sol in which Rh-doped $CeZrNdYO_x$ powder having a reduced particle size small enough to be used as a binder material is dispersed in a solvent is prepared. Through this process, the particle size of the Rh-doped $CeZrNdYO_x$ powder is reduced to 200 nm or less in terms of median diameter. In the pulverized Rh-doped $CeZrNdLaYO_x$ powder having a reduced particle size, Rh dissolved in the powder is exposed in a larger surface area than in unpluverized Rh-doped $CeZrNdLaYO_x$ powder. In addition, the surface area of the Rh-doped $CeZrNdLaYO_x$ powder is increased by pulverization, and thus, the Rh-doped $CeZrNdLaYO_x$ powder has a significantly enhanced catalyst performance though the Rh-doped $CeZrNdLaYO_x$ powder is a binder material.

On the other hand, the Pd-containing catalyst layer 3 also includes a CeZr-based composite oxide as described above, which can be prepared by the above process. As described above, Pd is supported on part of the CeZr-based composite oxide in the Pd-containing catalyst layer 3. In the Pd-containing catalyst layer 3, Pd is supported by evaporation to dryness using a nitric acid palladium solution, thereby preparing Pd-supporting CeZr-based composite oxide. In addition, Pd can also be supported on alumina particles by evaporation to dryness using a nitric acid palladium solution.

(Reduction Treatment)

In this embodiment, the Rh-supporting Zr-based composite oxide included in the Rh-containing catalyst layer 4 as described above is previously subjected to a reduction treatment, which is carried out by performing a heat treatment in a CO atmosphere. Here, in order to determine an optimum heat treatment temperature for a reduction treatment that can enhance catalyst performance, the relationship between the heat treatment temperature and the degree of dispersion of a metal Rh on the surface of a composite oxide as a support was examined. Tests performed for the determination will now be described.

First, Rh-supporting Zr-based composite oxide ($ZrLaYO_x$) was prepared in the manner described above. The composition of $ZrLaYO_x$ was $ZrO_2:La_2O_3:Y_2O_3=84:6:10$ (mass ratio), and the amount of Rh supported on the Rh-supporting Zr-based composite oxide was 0.33 mass %. The Rh-supporting Zr-based composite oxide was subjected to CO pulse adsorption, thereby measuring the degree of dispersion of Rh on the surface of the Zr-based composite oxide.

Figure 3:
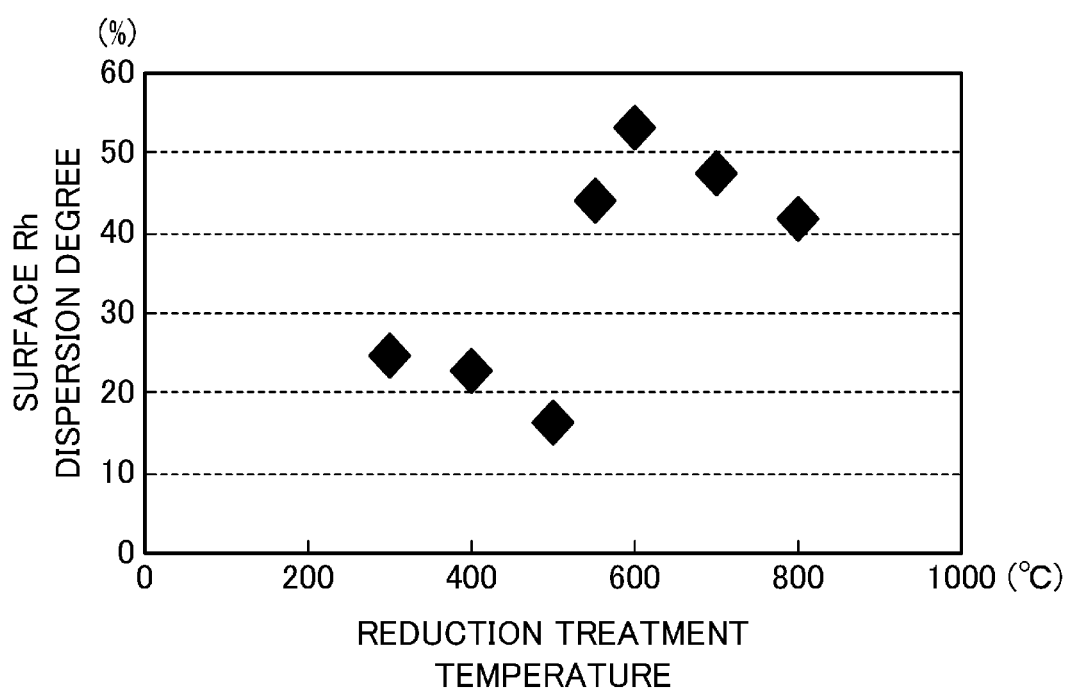
FIG. 3 is a graph showing a relationship between a reduction treatment temperature and a degree of dispersion of Rh on the surface of a support.

Before application of a CO pulse, in order to remove organic substances and moisture from the Rh-supporting Zr-based composite oxide, the temperature of the Rh-supporting Zr-based composite oxide was increased in an oxygen atmosphere from room temperature to 300° C. for 10 minutes. Once the temperature had reached 300° C., the Rh-supporting Zr-based composite oxide was kept at 300° C. for five minutes. Then, the temperature was increased from 300° C. to reduction treatment temperatures shown in Table 1 below. At this time, to maintain conditions of the catalyst surface until the temperature reached the reduction treatment temperatures, the supply of oxygen was stopped to create a vacuum state. After the temperature had reached the reduction treatment temperatures, the Rh-supporting Zr-based composite oxide was kept in a 100%-CO atmosphere, and was kept at the same temperatures for ten minutes. After the reduction treatment, the temperature was reduced to room temperature under the vacuum state, and a CO pulse was applied 30 times. The CO pulse application was carried out such that a valve was opened for 0.5 msec., and $9.38 \times 10^{-7}$ mol of CO was released. Table 1 and FIG. 3 show the degrees of dispersion of Rh and the amounts of CO adsorption under reduction treatment temperatures.

TABLE 1

| TREATMENT TEMPARATURE ° C. | AMOUNT OF PREPARED SAMPLE g | AMOUNT OF SUPPORTED Rh AS A THEORETICAL VALUE mol | AMOUNT OF A CO PULSE mol | AMOUNT OF ADSORBED CO mol | AMOUNT OF Rh mol | DEGREE OF DISPERSION % |
|---|---|---|---|---|---|---|
| 300 | 0.193 | $3.73 \times 10^{18}$ | $9.38 \times 10^{-7}$ | $1.52 \times 10^{-6}$ | $9.16 \times 10^{17}$ | 24.5 |
| 400 | 0.200 | $3.86 \times 10^{18}$ | $9.38 \times 10^{-7}$ | $1.46 \times 10^{-6}$ | $8.80 \times 10^{17}$ | 22.8 |
| 500 | 0.195 | $3.76 \times 10^{18}$ | $9.38 \times 10^{-7}$ | $1.01 \times 10^{-6}$ | $6.11 \times 10^{17}$ | 16.2 |
| 550 | 0.200 | $3.86 \times 10^{18}$ | $9.38 \times 10^{-7}$ | $2.82 \times 10^{-6}$ | $1.70 \times 10^{18}$ | 44.0 |
| 600 | 0.191 | $3.69 \times 10^{18}$ | $9.38 \times 10^{-7}$ | $3.27 \times 10^{-6}$ | $1.97 \times 10^{18}$ | 53.2 |
| 700 | 0.200 | $3.86 \times 10^{18}$ | $9.38 \times 10^{-7}$ | $3.05 \times 10^{-6}$ | $1.83 \times 10^{18}$ | 47.5 |
| 800 | 0.187 | $3.62 \times 10^{18}$ | $9.38 \times 10^{-7}$ | $2.51 \times 10^{-6}$ | $1.51 \times 10^{18}$ | 41.8 |

Here, the ratio of the amount of a metal Rh on the surface of a composite oxide derived from the amount of adsorbed CO, to the amount of supported Rh calculated as a theoretical value from the amount of a prepared sample was obtained as the degree of dispersion.

As shown in Table 1 and FIG. 3, the degree of dispersion of Rh at a reduction treatment temperature higher than or equal to 300° C. and lower than or equal to 500° C. is small, whereas the degree of dispersion rapidly increases at a temperature of higher than or equal to 550° C. and lower than or equal to 800° C. That is, when a reduction treatment is performed at a temperature of 550° C. to 800° C., both inclusive, the metal Rh is dispersed at a high dispersion over the surface of the composite oxide, and the surface area of the metal Rh increases. As a result, the contact area of the metal Rh with exhaust gas increases. In other words, a reduction treatment performed at a temperature of 550° C. to 800° C., both inclusive, can increase the number of active sites of the catalyst, thereby enhancing the catalyst performance. As shown in Table 1 and FIG. 3, the heat treatment temperature for the reduction treatment is preferably in the range from 550° C. to 700° C., both inclusive, and more preferably in the range from 600° C. to 700° C., both inclusive.

EXAMPLE

An example for describing the exhaust gas purification catalyst of the present disclosure in detail will now be described.

This example and a comparative example are both directed to the Rh-containing catalyst layer and the Pd-containing catalyst layer described above. Specifically, the Rh-containing catalyst layer included the Rh-supporting $ZrLaYO_x$, the Rh-supporting $CeZrNdLaYO_x$, the Zr-supporting La-containing alumina, and the Rh-doped $CeZrNdYO_x$ binder material. The composition ratio among these components was 21.1:63.3:3.7:8.6 (mass ratio). The composition of ZrLaYO$_x$ was ZrO$_2$:La$_2$O$_3$:Y$_2$O$_3$=84:6:10 (mass ratio), and 0.009 g/L of Rh was supported on this ZrLaYO$_x$ by evaporation to dryness using nitric acid rhodium. The composition of CeZrNdLaYO$_x$ was CeO$_2$:ZrO$_2$:Nd$_2$O$_3$:La$_2$O$_3$:Y$_2$O$_3$=10:75:5:5:5 (mass ratio), and 0.045 g/L of Rh was supported on this CeZrNdLaYO$_x$ by evaporation to dryness using nitric acid rhodium. The composition of CeZrNdYO$_x$ of the binder material was CeO$_2$:ZrO$_2$:Nd$_2$O$_3$:Y$_2$O$_3$=10:80:5:5 (mass ratio), and the content of Rh was 0.05 mass %.

On the other hand, the Pd-containing catalyst layer included Pd-supporting CeZrNdLaYO$_x$, Pd-unsupporting CeZrNdLaYO$_x$, Pd-supporting La-containing alumina, and a zirconia binder. The composition ratio among these components was 31.3:17.8:41.0:9.9 (mass ratio). The composition of CeZrNdLaYO$_x$ in the Pd-containing catalyst layer was CeO$_2$:ZrO$_2$:Nd$_2$O$_3$:La$_2$O$_3$:Y$_2$O$_3$=23:62:3:2:10 (mass ratio), and 0.04 g/L of Pd was supported on this CeZrNdLaYO$_x$ by evaporation to dryness using nitric acid palladium. On alumina, 0.2 g/L of Pd was supported by evaporation to dryness using nitric acid palladium.

In this example, a reduction treatment was performed on Rh-supporting ZrLaYO$_x$. In this aspect, this example is different from the comparative example. Specifically, in this example, a reduction treatment was carried out by performing a heat treatment on Rh-supporting ZrLaYO$_x$ at 600° C. for 60 minutes in a 1%-CO environment.

After preparation of the exhaust gas purification catalysts of this example and the comparative example, an exhaust gas purification performance test was conducted on these catalysts. It will be described how the exhaust gas purification performance test was conducted.

First, the catalysts of this example and the comparative example were aged, and subjected to a heat treatment at 1000° C. for 24 hours in an atmospheric gas heat treatment reactor (with 2% of O$_2$, 10% of H$_2$O, and residue of N$_2$).

A core sample with a support capacity of about 25 mL (diameter: 25.4 mm, length: 50 mm) was then attached to a gas distribution reactor so as to measure light-off temperatures T50 (° C). and exhaust gas purification efficiencies C400 for purification of HC, CO, and NO$_x$. A light-off temperature T50 (° C.) is a catalyst inlet gas temperature measured by gradually increasing the temperature of a model exhaust gas flowing in a catalyst from room temperature, detecting changes in concentration of HC, CO, and NO$_x$ contained in a gas flowing out of the catalyst, and measuring the temperature when the purification efficiency of each of the components reaches 50%. An exhaust gas purification efficiency C400 is a purification efficiency of each of HC, CO, and NO$_x$ when the model exhaust gas temperature at a catalyst inlet is 400° C.

The model exhaust gas was set at A/F=14.7±0.9. Specifically, a mainstream gas of A/F=14.7 was allowed to constantly flow, and a predetermined amount of gas for changing the A/F ratio was added in pulses at a rate of 1 Hz, thereby forcedly oscillating the A/F ratio in the range of ±0.9. Space velocity SV was 60000 h$^{-1}$, and a rate of temperature increase was 30° C./minute. Table 2 shows gas compositions when the A/F ratio was 14.7, 13.8, and 15.6.

TABLE 2

| | A/F | | |
|---|---|---|---|
| | 13.8 | 14.7 | 15.6 |
| C$_3$H$_6$ (ppmC) | 541 | 555 | 548 |
| CO (%) | 2.35 | 0.60 | 0.59 |
| NO (ppm) | 975 | 1000 | 980 |
| CO$_2$ (%) | 13.55 | 13.90 | 13.73 |

TABLE 2-continued

| | A/F | | |
|---|---|---|---|
| | 13.8 | 14.7 | 15.6 |
| H$_2$ (%) | 0.85 | 0.20 | 0.20 |
| O$_2$ (%) | 0.58 | 0.60 | 1.85 |
| H$_2$O (%) | 10 | 10 | 10 |
| N$_2$ | BALANCE | BALANCE | BALANCE |

Figure 4:
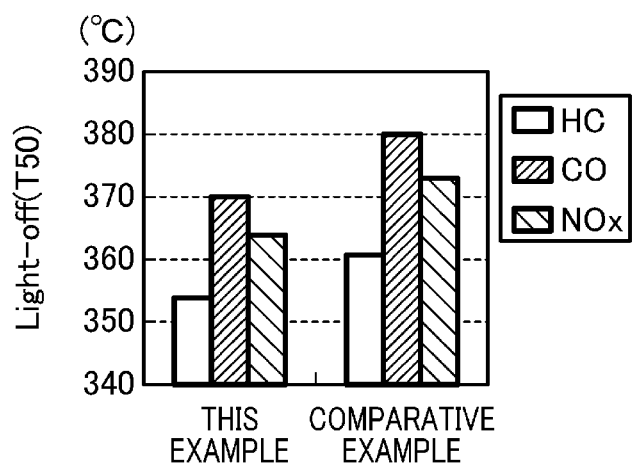
FIG. 4 is a graph showing light-off temperatures (T50) of an example of the present disclosure and a comparative example.
Figure 5:
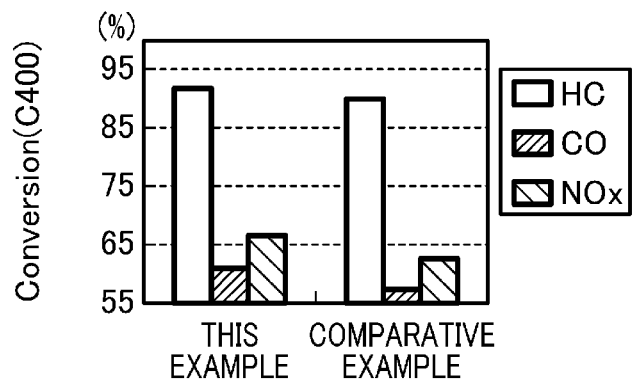
FIG. 5 is a graph showing purification performances (C400) in steady states of the example of the present disclosure and the comparative example.

Results of the exhaust gas purification performance test will now be described with reference to FIGS. 4 and 5. FIG. 4 is a graph showing temperatures T50 (° C.) of the catalyst of this example and the catalyst of the comparative example. FIG. 5 is a graph showing exhaust gas purification efficiencies C400 of the catalyst of this example and the catalyst of the comparative example.

Comparison between the temperature T50 of this example and the temperature T50 of the comparative example shows that the catalyst of this example can purify HC, CO, and NO$_x$ at lower temperatures than that of the comparative example, as shown in FIG. 4. This is because the reduction treatment on Rh-supporting ZrLaYO$_x$ causes Rh supported on ZrLaYO$_x$ to be deposited on the surface in a metal state, and the surface area increases accordingly. Thus, the contact area that is in contact with exhaust gas increases, resulting in an enhanced purification efficiency.

Comparison between the exhaust gas purification efficiency C400 of this example and the exhaust gas purification efficiency C400 of the comparative example shows that the catalyst of this example has higher purification efficiencies of HC, CO, and NO$_x$ than that of the comparative example, as shown in FIG. 5. This is because of the same reasons as described above, i.e., the reduction treatment on Rh-supporting ZrLaYO$_x$ enhances catalyst performance.

The above results suggest that the use of reduction-treated Rh-supporting Zr-based composite oxide as a catalytic material can enhance exhaust gas purification performance of a catalytic material.

What is claimed is:

1. An exhaust gas purification catalyst in which a Rh-containing catalyst layer is provided on a base material, wherein
   the Rh-containing catalyst layer includes Rh-supporting Zr-based composite oxide in which Rh is supported on Zr-based composite oxide containing Zr and a rare earth metal except Ce and showing oxygen ion conduction,
   the Rh-supporting Zr-based composite oxide has been previously subjected to a reduction treatment so that a metal Rh is dispersed on a surface of the Zr-based composite oxide, and
   the Rh-containing catalyst layer further includes Rh-supporting CeZr-based composite oxide in which Rh is supported on CeZr-based composite oxide containing Zr and Ce and which is not subjected to the reduction treatment, and a binder material of Rh-doped CeZr-based composite oxide in which Rh is dissolved in the CeZr-based composite oxide containing Zr and Ce and which is not subjected to the reduction treatment.

2. The exhaust gas purification catalyst of claim 1, wherein the reduction treatment is performed at a temperature of 550° C. to 800° C., both inclusive, in a reduction atmosphere containing CO.

3. The exhaust gas purification catalyst of claim 2, wherein a Pd-containing catalyst layer is provided between the Rh-containing catalyst layer and the base material.

4. The exhaust gas purification catalyst of claim 1, wherein a Pd-containing catalyst layer is provided between the Rh-containing catalyst layer and the base material.

5. A method for producing the exhaust gas purification catalyst of claim 4, the method comprising:
providing Pd-containing catalyst layer on a surface of the base material;
preparing Rh-supporting Zr-based composite oxide in which Rh is supported on Zr-based composite oxide containing Zr and a rare earth metal except Ce, Rh-supporting CeZr-based composite oxide in which Rh is supported on CeZr-based composite oxide containing Zr and Ce, and Rh-doped CeZr-based composite oxide obtained by dissolving Rh in CeZr-based composite oxide serving as a binder material;
performing a heat treatment on the Rh-supporting Zr-based composite oxide at a temperature of 550° C. to 800° C., both inclusive, in a reduction atmosphere containing CO;
mixing the Rh-supporting Zr-based composite oxide subjected to the heat treatment, the Rh-supporting CeZr-based composite oxide, and the Rh-doped CeZr-based composite oxide together to produce a mixture, and making the mixture into slurry, thus preparing a Rh-containing catalytic material; and
providing the Rh-containing catalytic material on a surface of the Pd-containing catalyst layer.

* * * * *